United States Patent [19]

Fushimoto

[11] Patent Number: 4,532,529
[45] Date of Patent: Jul. 30, 1985

[54] ELECTRONIC APPARATUS HAVING PRINTING MECHANISM

[75] Inventor: Hideo Fushimoto, Kawasaki, Japan

[73] Assignee: Canon Kabushiki Kaisha, Tokyo, Japan

[21] Appl. No.: 581,439

[22] Filed: Feb. 17, 1984

[30] Foreign Application Priority Data

Feb. 21, 1983 [JP] Japan ................ 58-26267

[51] Int. Cl.$^3$ .............. G01D 15/16; B65H 19/00; B43K 27/12
[52] U.S. Cl. .............. 346/136; 346/139 R; 242/55.2; 401/35
[58] Field of Search ........... 346/136, 139 R, 145; 242/55.2, 55.55, 141; 401/34, 35, 57, 90

[56] References Cited

U.S. PATENT DOCUMENTS

| 2,275,545 | 3/1942 | Miller | 242/141 X |
| 3,329,367 | 7/1967 | Paradiso | 242/55.55 |
| 3,790,291 | 2/1974 | Hung et al. | 401/57 |
| 4,038,666 | 7/1977 | Fuller, Jr. | 346/136 |
| 4,112,711 | 9/1978 | Tripp | 242/141 X |
| 4,120,464 | 10/1978 | Uritis | 346/136 X |
| 4,401,996 | 8/1983 | Shirahata | 346/139 R |
| 4,405,931 | 9/1983 | Fujisawa | 346/139 R |
| 4,441,109 | 4/1984 | Fujisawa | 346/139 R |

FOREIGN PATENT DOCUMENTS 1550725 12/1968 France .................. 401/34

Primary Examiner—George H. Miller, Jr.
Attorney, Agent, or Firm—Fitzpatrick, Cella, Harper & Scinto

[57] ABSTRACT

An electronic apparatus has a ball-point pen as the recording means and rotatably supports a roll of printing paper on a shaft provided on the side surface of the main body of the electronic apparatus, wherein the shaft to support the printing paper is made hollow inside, a cap is fitted in each opening at both ends of the shaft in a freely openable and closable manner so as to enable spare ball-point pens and a ball-point pen removed from a carriage of the electronic apparatus, when it is not in use, to be housed inside it.

8 Claims, 6 Drawing Figures

FIG. 5 PRIOR ART
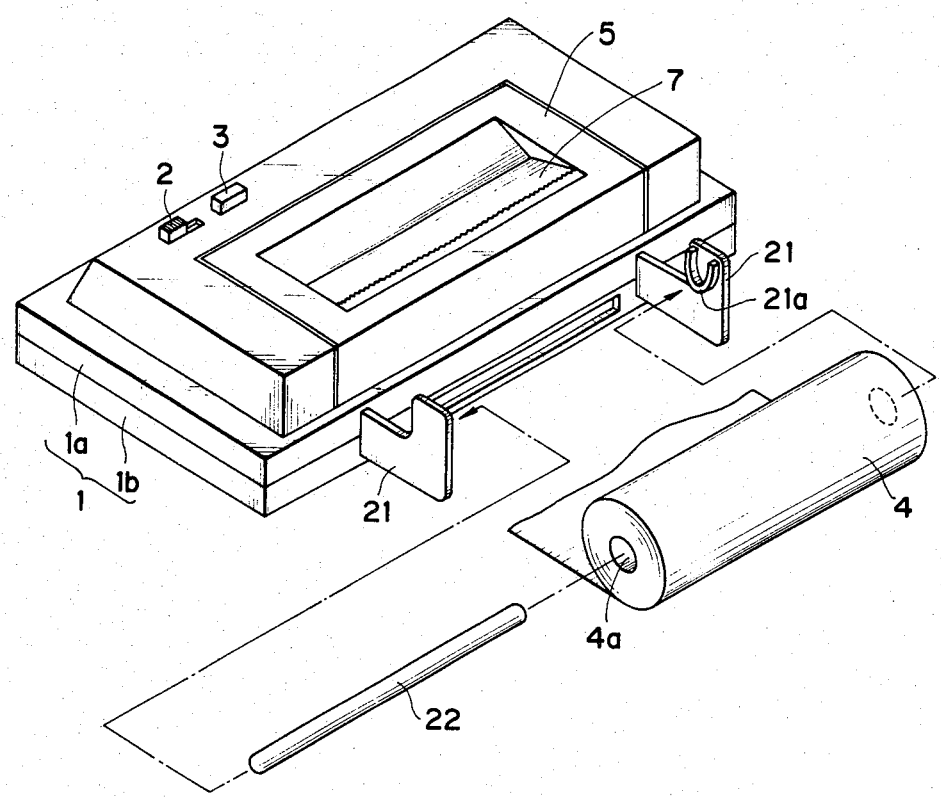
FIG. 6A
FIG. 6B
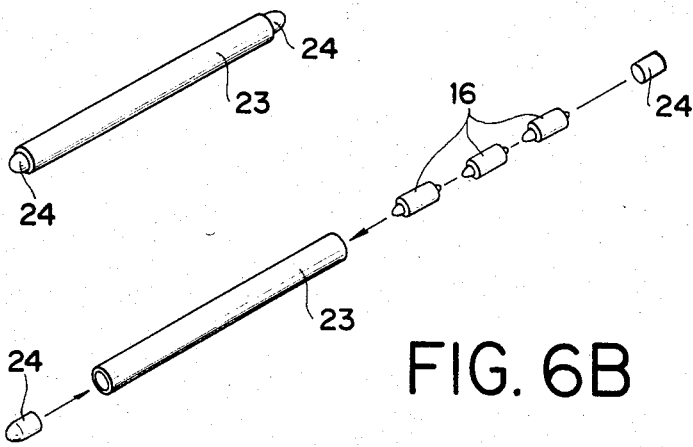

ELECTRONIC APPARATUS HAVING PRINTING MECHANISM

BACKGROUND OF THE INVENTION

1. Field of the Invention

This invention relates to an electronic apparatus, and, more particularly, it is concerned with an electronic apparatus such as, for example, a recording type electronic desk calculator provided with a roll of recording paper and a recording means using a ball-point pen (i.e., a recording member having ink contained therein).

2. Description of the Prior Art

One example of the conventional electronic apparatus having a recording means utilizing the ball-point pen is illustrated in FIGS. 1 to 4 of the accompanying drawing.

In FIGS. 1 and 2, a reference numeral 1 designates a main body of the electronic apparatus, which is composed of an upper casing 1a and a lower casing 1b to be fitted and fastened together by threaded bolts etc. Within this main body 1, there is placed a printing device to be described later.

The top surface of the upper casing 1a has a power source switch 2 and a button key 3 to perform various controlling operations of the printing device, all of them being electrically connected with an operational circuit disposed inside the main body 1.

A reference numeral 4 denotes printing paper which is wound in a roll form. The forward end of the printing paper is led out of an opening part formed in a cover 5 provided in a detachably attachable manner on the top surface of the upper casing 1a.

A paper cutter 7 appears at the opening part 6 to enable the printing paper 4 to be severed at any arbitrary position.

At the near side of the main body 1, there is provided an arm 8 formed of a metal rod, etc. which extends along the main body 1 and is bent at both end parts. The roll of printing paper is rotatably supported on this arm 8.

FIGS. 3 and 4 illustrate the printing device to be housed in the main body 1.

In the drawing, the printing device 9 is assembled in a rectangular frame as the base: a guide bar 11 is laterally extended between a pair of side walls of the frame and a carriage 10 is slidably fitted on this guide bar 11. The carriage 10 is reciprocally driven in the horizontal direction by a pulse motor 12.

Further, a platen 13 is rotatably provided in parallel with the guide bar 11, one end of which platen has a gear 14 fixed thereon outside the frame. The gear 14 is meshed with a pinion gear 14b fixed on the output shaft of another pulse motor 15 through an intermediate gear 14a. A pair of pinch rollers 13a, 13a are disposed at both end parts of the platen 13. The abovementioned printing paper 4 is led out of a clearance between the platen 13 and the roller 13a, passing underneath the platen 13.

By the way, a ball-point pen 16 as the recording means is mounted on the carriage 10, and the rear end part 16a of the pen is in contact with the top end part of a hammer 19. The bottom end part of the hammer 19 is axially supported on a shaft 18 in a rotatable manner, and is oscillated by a solenoid 17 mounted on the side surface of the frame.

On the other hand, a return spring 20 which is bent in an L-shape with its one side being directed upward is provided on the carriage 10 to the side of the platen 13. This upright portion has a small perforation formed in one part of it, through which passes the front distal end 16b of the ball-point pen 16 confronting to the platen 13.

In the electronic apparatus having the construction as described above, when the printing signal is applied to the solenoid 17, the hammer 19 is rotated clockwise with the shaft 18 as the center of its rotation as shown by an arrow a in FIG. 4, and pushes the rear end of the ball-point pen 16. On account of this, the ball-point pen is pushed forward in the direction of an arrow b against the resilient force of the return spring 20 to thereby perform the dot printing on printing paper wound on the platen 13. As soon as electric conduction to the solenoid 17 is interrupted the ball-point pen 16 returns to its original position by the force of the return spring 20. In this manner, the printing operations are sequentially carried out.

FIG. 5 illustrates another example of the holding structure for the printing paper 4, in which a set of supporting plates (or brackets) 21, 21 are projectively provided on the rear surface side of the main body 1. The mutually opposite surfaces of the supporting plates 21, 21 each has a U-shaped bearing 21a formed thereon, and a shaft 22 for the printing paper 4 is supported on this bearing 21a in a freely rotatable and detachable manner. The shaft 22 is inserted into the center hole 4a of the roll of printing paper 4. It is thus possible to rotatably support the rolled printing paper 4 by the use of such construction as mentioned above.

However, in the electronic apparatus having the recording means using the ball-point pen as mentioned above, there is such an inconvenience that, since the tip of the ball-point pen is, as a matter of course, exposed to the external air during its use, the ink tends to solidify and clog the pen, if the tip end of it is left exposed to the external air while it is not in use.

As the measures against such solidification of ink, therefore, it has heretofore been a practice with the conventional device that the ball-point pen 16 is removed from the carriage 10 and the tip end part of the pen is covered with a cap. This involves an extremely complicated procedure, and, moreover, it happens frequently that the ball-point pen 16 of a relatively small size and of a special design is lost due to its being left somewhere and forgotten. Further, some numbers of spare ball-point pens are usually reserved not only in anticipation of its missing, but also in preparation for ink exhaustion. In most cases, however, these spare ball-point pens are stored in a separate place from the electronic apparatus, as in a desk drawer, etc.. Taking into further consideration out troubles in finding out such small piece of the missing ball-point pen, therefore, the exchanging operation of the ball-point pen, in conjunction with the abovementioned removal of the ball-point pen from the carriage and capping of its distal end, becomes far more complicated.

SUMMARY OF THE INVENTION

The present invention has been made with a view to removing the above-described disadvantages inherent in the conventional electronic apparatus with recording means, and aims at providing the electronic apparatus with an extremely simple construction, in which the ink in the ball-point pen can be prevented from drying when the electronic apparatus is not in use, and the spare ball-point pens can be stored in a location within the electronic apparatus itself.

According to the present invention, in general aspect of it, there is provided a recording device which carries out recording on recording paper by use of a recording means which is detachably mounted thereon and in which printing ink is reserved, the recording device comprising: a carriage to place the recording means thereon; a supporting member for supporting the recording paper; and a housing section formed in the supporting member to receive and store therein the recording means.

According to the present invention, in another aspect of it, there is provided a recording device which carries out recording on recording paper by use of a recording means which is detachably mounted thereon and in which printing ink is reserved, the recording device comprising: a shaft for holding the recording paper; a housing section formed in the shaft and to receive and store therein the recording means; and a supporting member which serves to close inlet/outlet openings of the housing section and support the shaft on the recording device.

The foregoing objects, the objects as well as specific construction and function of the device according to the present invention will become more apparent and understandable from the following detailed description thereof, when read in conjunction with the accompanying drawing.

BRIEF DESCRIPTION OF THE DRAWINGS

In the drawing:

FIGS. 1 through 4 explain the conventional structure of the electronic apparatus with recording means, wherein FIG. 1 is a perspective view seen from the front side;

FIG. 2 is also perspective view seen from the rear side;

FIG. 3 is a perspective view of a printing device; and

FIG. 4 is a schematic side view of the printing device;

FIG. 5 is a perspective view showing another construction of the conventional electronic apparatus with recording means;

FIG. 6A is a perspective view showing one embodiment of the electronic apparatus according to the present invention; and FIG. 6B is an exploded perspective view of the embodiment shown in FIG. 6A.

DETAILED DESCRIPTION OF PREFERRED EMBODIMENTS

Figure 1:
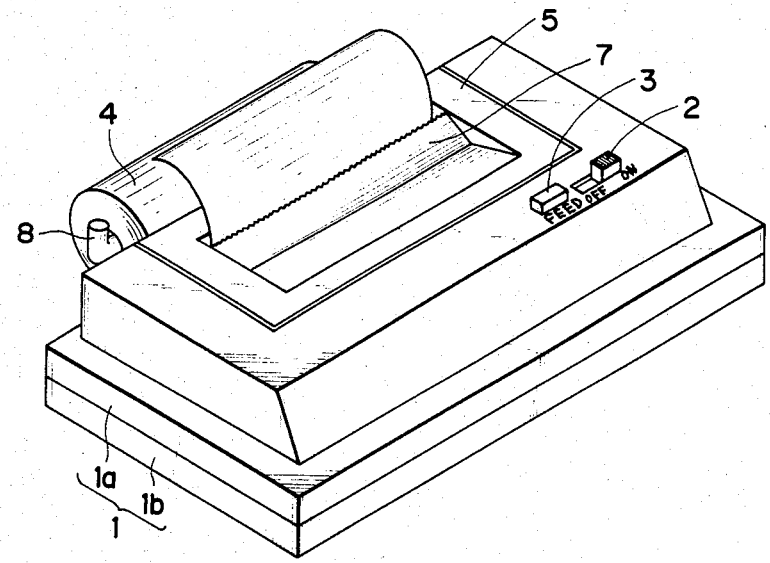
Figure 2:
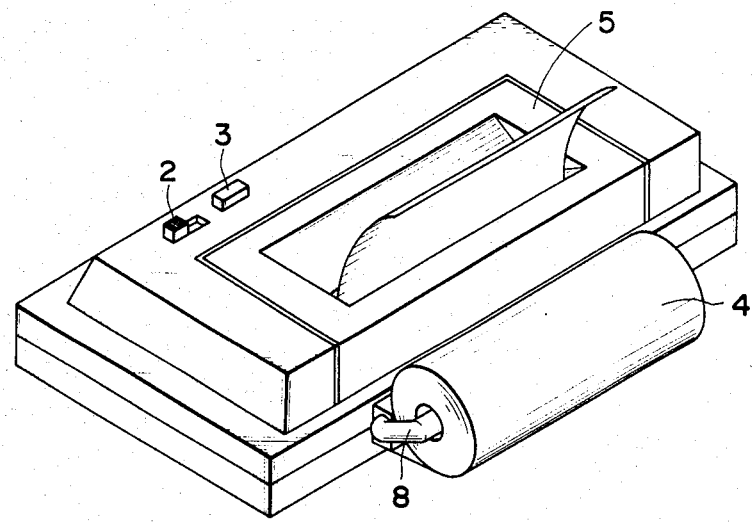
Figure 3:
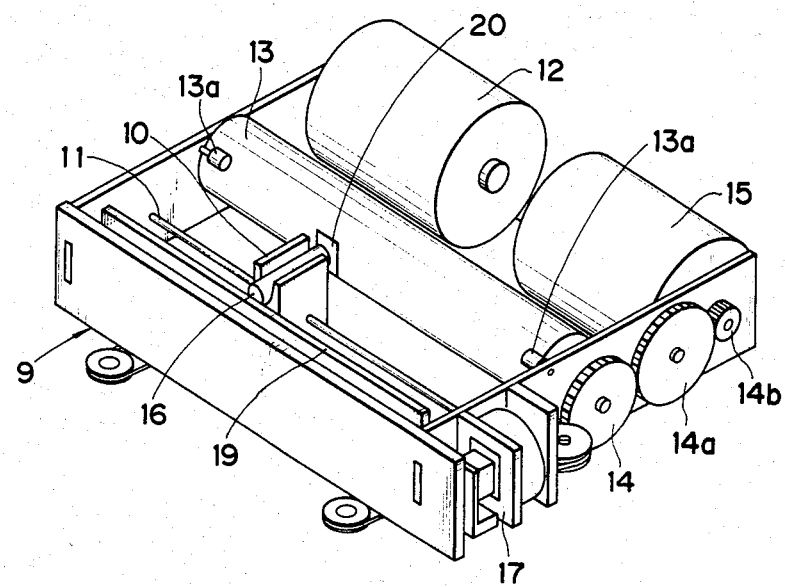
Figure 4:
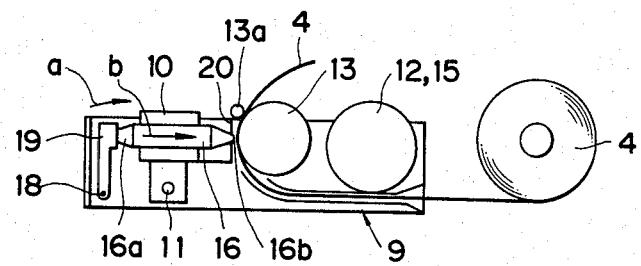

In the following, the present invention will be described in detail with reference to a preferred embodiment thereof shown in the drawing.

Referring to FIGS. 6A and 6B showing a preferred embodiment of the present invention, a reference numeral 23 designates a shaft to rotatably support thereon the printing paper 4, which corresponds to the shaft 22 in FIG. 5. The shaft 23 is formed hollow inside and its both ends are fitted with caps 24 in a freely detachable and attachable manner. The cap 24 is in rotatable contact with the bearing 21a provided on the supporting plates 21. With such construction of the shaft 23, therefore, a plurality of ball-point pens 16 can be housed inside the hollow shaft 23 by removing the cap 24, as shown in FIG. 6B.

As the consequence of this, when the electronic apparatus is not in use, the ball-point pen 16 is removed from the carriage and is housed in the hollow shaft 23 by taking off the cap 24 at either side of the shaft, and thereafter closing its opening again with the cap 24, whereby it can be isolated from the external air to prevent the ink in it from drying up. In addition, since the spare ball-point pens are stored in one portion of the electronic apparatus per se, not at a position separate from the apparatus such as a desk drawer, etc., exchanging the ball-point pen can be effected with extreme readiness, and also possible loss of the ball-point pen can be prevented.

As is apparent from the foregoing explanation, the present invention has a construction such that the shaft provided on the side of the electronic apparatus for rotatably supporting a roll of printing paper is made hollow inside, and the opening at both ends of the shaft are each closed with a cap in a detachable manner so as to enable spare ball-point pens and the ball-point pen removed from the carriage when it is not in use to be received and stored inside the hollow shaft. Owing to such construction, it becomes possible to prevent the ink in the ball-point pen removed from the carriage from drying up and the pen from unexpected loss, and to enable exchanging the pen with extreme readiness.

What I claim is:

1. A recording device which carries out recording on recording paper by use of recording means which is detachably mounted on said device and in which printing ink is reserved, said recording device comprising:
    (a) a carriage to place said recording means thereon;
    (b) a supporting member for supporting said recording paper; and
    (c) a housing section formed in said supporting member to receive and store therein said recording means.

2. The recording device as set forth in claim 1, wherein said supporting member is a shaft, both ends of which are each fitted with a member adapted to open and close the opening therein.

3. The recording device as set forth in claim 1, further comprising fitting members provided outside the casing of said recording device, said fitting members bearing said supporting member.

4. A recording device which carries out recording on recording paper by use of recording means which is detachably mounted on said device and in which printing ink is reserved, said recording device comprising:
    (a) a shaft for holding said recording paper;
    (b) a housing section formed in said shaft and to receive and store therein said recording means; and
    (c) holding members which serve to close the openings of said housing section and to support said shaft on said recording device.

5. The recording device as set forth in claim 4, further comprising fitting members provided outside the casing of said recording device and for supporting said holding member.

6. The recording device as set forth in claim 4, wherein said holding member has a circular cross-section.

7. The recording device as set forth in claim 5, wherein said each fitting member has an opening which enables said holding member to be removed.

8. An electronic apparatus which utilizes a ball-point pen as recording means, and rotatably supports a roll of printing paper on a shaft provided on the side surface of the main body thereof, wherein said apparatus is characterized in that said shaft for supporting said printing paper is made hollow inside, and that both ends of said hollow shaft are each fitted with a cap member to open and close the openings at said ends so as to enable spare ball-point pens and a ball-point pen which has been removed when the electronic apparatus is not in use to be received and stored inside said hollow shaft.

* * * * *

UNITED STATES PATENT AND TRADEMARK OFFICE
CERTIFICATE OF CORRECTION

PATENT NO. : 4,532,529

DATED : July 30, 1985

INVENTOR(S) : HIDEO FUSHIMOTO

It is certified that error appears in the above-identified patent and that said Letters Patent is hereby corrected as shown below:

Column 1, line 15, "the" (second occurrence) should read --a--;
line 34, delete "6".

Column 2, line 48, "its missing" should read --being lost--;
line 52, delete "out" (both occurrences).

Signed and Sealed this

Eighth Day of April 1986

[SEAL]

Attest:

DONALD J. QUIGG

Attesting Officer

Commissioner of Patents and Trademarks